Patented Jan. 24, 1950

2,495,440

UNITED STATES PATENT OFFICE 2,495,440

DICHLOROACETIC ACID PURIFICATION

Edgar C. Britton and Luther F. Berhenke, Midland, Mich., assignors to The Dow Chemical Company, Midland, Mich., a corporation of Delaware No Drawing. Application April 8, 1946,
Serial No. 660,425

2 Claims. (Cl. 260—539)

This invention relates to an improved method of purifying dichloroacetic acid.

In the industrial manufacture of monochloroacetic acid by the direct chlorination of glacial acetic acid, the monochloroacetic acid is recovered from the crude chlorination product by fractional crystallization. The mother liquor remaining after this crystallization contains, in addition to monochloroacetic acid, a large proportion of dichloroacetic acid, together with much lesser proportions of acetic acid and trichloroacetic acid. This mother liquor is usually subjected to distillation to remove acetic acid and sometimes part of the monochloroacetic acid, leaving a residue which is termed crude dichloroacetic acid.

The separation of dichloroacetic acid in pure form from this crude material by rectification has proved unsatisfactory because of the proximity of the boiling points of dichloroacetic acid and its mono- and tri-chloroacetic acid impurities, and purification by fractional crystallization is likewise difficult because the dichloroacetic acid has a lower melting point than the impurities. Even existing chemical procedures for the purification of crude dichloroacetic acid rarely produce a material much more than 90 per cent pure. In consequence, dichloroacetic acid as a substantially pure chemical entity is commercially unknown.

A principal object of the present invention, therefore, is to provide a simple, commercially feasible process for making substantially pure dichloroacetic acid. A related object is to provide an improved method of recovering high purity dichloroacetic acid in good yield from the crude dichloroacetic acid produced during the chlorination of acetic acid.

According to the invention, substantially pure dichloroacetic acid may be recovered from crude dichloroacetic acid by subjecting the latter to esterification with a lower aliphatic alcohol, isolating the resulting dichloroacetic acid ester from the esterification product, subjecting the isolated ester to hydrolysis to reform dichloroacetic acid substantially free of the impurities present in the crude acid, and separating the dichloroacetic acid thus purified from the hydrolysis product.

The process depends upon the fact that the lower aliphatic esters of dichloroacetic acid possess physical properties which permit their ready separation from the corresponding esters of mono- and tri-chloroacetic acids, and are easily hydrolyzed back to the free acid without the occurrence of appreciable side reactions. Dichloroacetic acid having a purity of 99.5 per cent or higher, and a freezing point of at least 12.6° C., may readily be prepared in good yield. At this high purity, dichloroacetic acid has shown promise as a food and beverage preservative, being of far lower toxicity than dichloroacetic acid products heretofore available.

Esterification of the crude dichloroacetic acid according to the invention may be effected with any lower aliphatic alcohol, i. e. any alcohol containing four or less carbon atoms per molecule, such as methanol, ethanol, n- and i-propanol, and n, i-, and t-butanol. Methanol is perhaps most satisfactory.

The esterification step is conveniently effected by mixing the lower aliphatic alcohol with the crude dichloroacetic acid in a quantity at least sufficient to convert all the carboxylic acids present therein to esters and heating the mixture at an elevated temperature until esterification is substantially complete. If desired, a small proportion of an esterification catalyst, such as hydrogen chloride, may be added. The water liberated during reaction is preferably removed as it forms, conveniently by including flake calcium chloride or other dehydrating agent in the esterification mixture.

The esterification product, which consists principally of dichloroacetic acid ester together with the esters of monochloroacetic acid and the other acids present in the crude starting material, is next treated to separate the dichloroacetic acid ester in a high degree of purity. Rectification of the esterified material in a multi-plate column, preferably at reduced pressure, is highly effective for this purpose, although other separatory methods may also be used.

The substantially pure ester of dichloroacetic acid resulting from the separation step is next hydrolyzed to reform dichloroacetic acid by heating with a stoichiometric excess of water for a time sufficient for the hydrolysis substantially to reach completion. While hydrolysis catalysts may be employed, it is highly preferable, to obtain a product of maximum purity, to effect hydrolysis by means of water alone. Optimum rates of reaction are achieved by carrying out the hydrolysis at the boiling point and allowing the alcohol liberated to volatilize as it forms. The alcohol is then returned to a subsequent esterification.

The hydrolysis product is treated to separate the reformed dichloroacetic acid from other materials present, chiefly water. To this end, the hydrolysate is conveniently rectified in a good column to boil off the water, leaving a residue consisting almost wholly of dichloroacetic acid of high purity. If desired, further slight purification may be effected by fractionally distilling the residue at reduced pressure to remove last traces of lower and higher boiling materials.

The following example will further illustrate the invention.

*Example*

Crude dichloroacetic acid from the chlorination of acetic acid was esterified with methanol, using flake calcium chloride as a dehydrating agent. A charge of 1100 pounds of the crude acid was mixed with 400 pounds of methanol and 800 pounds of calcium chloride and the mixture was heated at its refluxing temperature for 7 hours. The product was then neutralized with sodium carbonate and distilled roughly, 1100 pounds of mixed ester being obtained.

A charge of 600 pounds of the resulting esterified product was fractionally distilled through a packed column at an absolute pressure of 3 inches of mercury, the cut boiling from 78° C. to 81° C. being taken as substantially pure methyl dichloroacetate, 260 pounds being obtained.

A charge of 142 pounds (0.99 mol) of this methyl dichloroacetate and 54 pounds (3.0 mols) of water was loaded into a batch still provided with a packed fractionating column and was heated to boiling at atmospheric pressure. After 1.0 hour, the temperature of the still head fell to 65° C. and distillation of methanol began. The column was then regulated automatically to hold this head temperature, allowing only methanol to be drawn off. After 42 hours methanol ceased forming at a practical rate.

The still and column were then controlled to distill off the water and unreacted ester, after which fractional distillation was carried out at an absolute pressure of 1.5 inches of mercury. A cut of 102 pounds (0.79 mol) of material boiling at from 111° to 113° C. was collected as dichloroacetic acid of high purity.

This product was a colorless liquid having a freezing point of 12.6° C. and was found on titration with standard alkali to be of 99.9 per cent purity. A careful thermal analysis, made by following the temperature changes of the material on cooling through its freezing point, indicated a purity of 99.8 per cent. The product had a specific gravity (25°/25°) of 1.563 and an atmosphere boiling point of 194.2° C.

What is claimed is:

1. The method of recovering dichloroacetic acid in a high degree of purity from crude dichloroacetic acid which comprises heating the crude acid with at least an equivalent quantity of a lower aliphatic alcohol for a time sufficient to convert the acids present therein to the corresponding esters, drying the esterification product and rectifying the dry material to separate substantially pure dichloroacetic acid ester, heating the ester with a stoichiometric excess of water in the absence of catalyst and at the boiling point for a time sufficient to effect hydrolysis of the ester while removing the alcohol thus liberated as fast as it forms, thereby producing an aqueous solution of dichloroacetic acid substantially free of the impurities present in the crude acid, and rectifying the aqueous solution to separate dichloroacetic acid in purified form.

2. The method of recovering dichloroacetic acid in a high degree of purity from crude dichloroacetic acid produced by the chlorination of acetic acid which comprises heating the crude acid with at least an equivalent quantity of methanol for a time sufficient to convert the acids present therein to the corresponding methyl esters while removing the water thus produced as it forms, rectifying the dry esterification product to separate substantially pure methyl dichloroacetate, heating the methyl dichloroacetate with a stoichiometric excess of water in the absence of catalyst and at the boiling point for a time sufficient to effect hydrolysis of the ester while removing the methanol thus liberated as fast as it forms, thereby producing an aqueous solution of dichloroacetic acid substantially free of the impurities present in the crude acid, and rectifying the aqueous solution to separate dichloroacetic acid in purified form.

EDGAR C. BRITTON.
LUTHER F. BERHENKE.

REFERENCES CITED

The following references are of record in the file of this patent:

UNITED STATES PATENTS

| Number | Name | Date |
|---|---|---|
| 1,921,717 | Amstutz | Aug. 8, 1933 |
| 2,350,370 | Schopmeyer et al. | June 6, 1944 |

FOREIGN PATENTS

| Number | Country | Date |
|---|---|---|
| 663,425 | France | Aug. 21, 1929 |

OTHER REFERENCES

Salmi et al., Ber. Deut. Chem., vol. 73B, pps. 1126–1131 (1940).

Whitmore, "Organic Chemistry," p. 338, D. Van Nostrand Co., Inc., N. Y. (1942).